(12) United States Patent
Albrecht et al.

(10) Patent No.: US 7,503,615 B2  
(45) Date of Patent: Mar. 17, 2009

(54) WINDOW WIPING DEVICE, PARTICULARLY FOR A MOTOR VEHICLE

(75) Inventors: Gerard Albrecht, Hatten (FR); Roland Bohn, Buehl (DE); Francois Schabanel, Saint Maux des Fosses (FR); Jean-Marc Ritt, Strasbourg (FR)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 10/587,634

(22) PCT Filed: Dec. 1, 2004

(86) PCT No.: PCT/EP2004/053208

§ 371 (c)(1),  
(2), (4) Date: Jul. 28, 2006

(87) PCT Pub. No.: WO2005/073039

PCT Pub. Date: Aug. 11, 2005

(65) Prior Publication Data

US 2008/0052863 A1    Mar. 6, 2008

(30) Foreign Application Priority Data

Feb. 2, 2004    (DE) ................. 10 2004 005 067

(51) Int. Cl.  
*B60J 1/02*    (2006.01)

(52) U.S. Cl. .................. 296/96.15; 296/96.17
(58) Field of Classification Search .......... 296/96.15, 296/96.17  
See application file for complete search history.

(56) References Cited

FOREIGN PATENT DOCUMENTS

| DE | 198 33 404 | 1/2000 |
|---|---|---|
| DE | 100 62 617 | 5/2002 |
| FR | 2 842 154 | 1/2004 |
| WO | WO 2004/065186 | 8/2004 |
| WO | WO 2004/089707 | 10/2004 |

*Primary Examiner*—Lori L Lyjak  
(74) *Attorney, Agent, or Firm*—Michael Best & Friedrich LLP

(57) ABSTRACT

The invention starts with a windshield wiper device (10), in particular for a motor vehicle, comprising at least one driving element (16) that can be fastened to the motor vehicle, at least two essentially elongate fastening elements (22, 48) which are disposed in an axially rigid manner and are able to engage in receptacles (24, 46) of the motor vehicle, and at least one damping element (28, 60) for damping mechanical vibrations. It is proposed that the driving element (16) has a driven shaft (44) and the fastening elements (22, 48) are positioned such that the driving element (16) can be fastened by being rotated around the driven shaft (44) or an axis that runs essentially parallel thereto.

19 Claims, 4 Drawing Sheets

WINDOW WIPING DEVICE, PARTICULARLY FOR A MOTOR VEHICLE

PRIOR ART

Figures 1, 2:
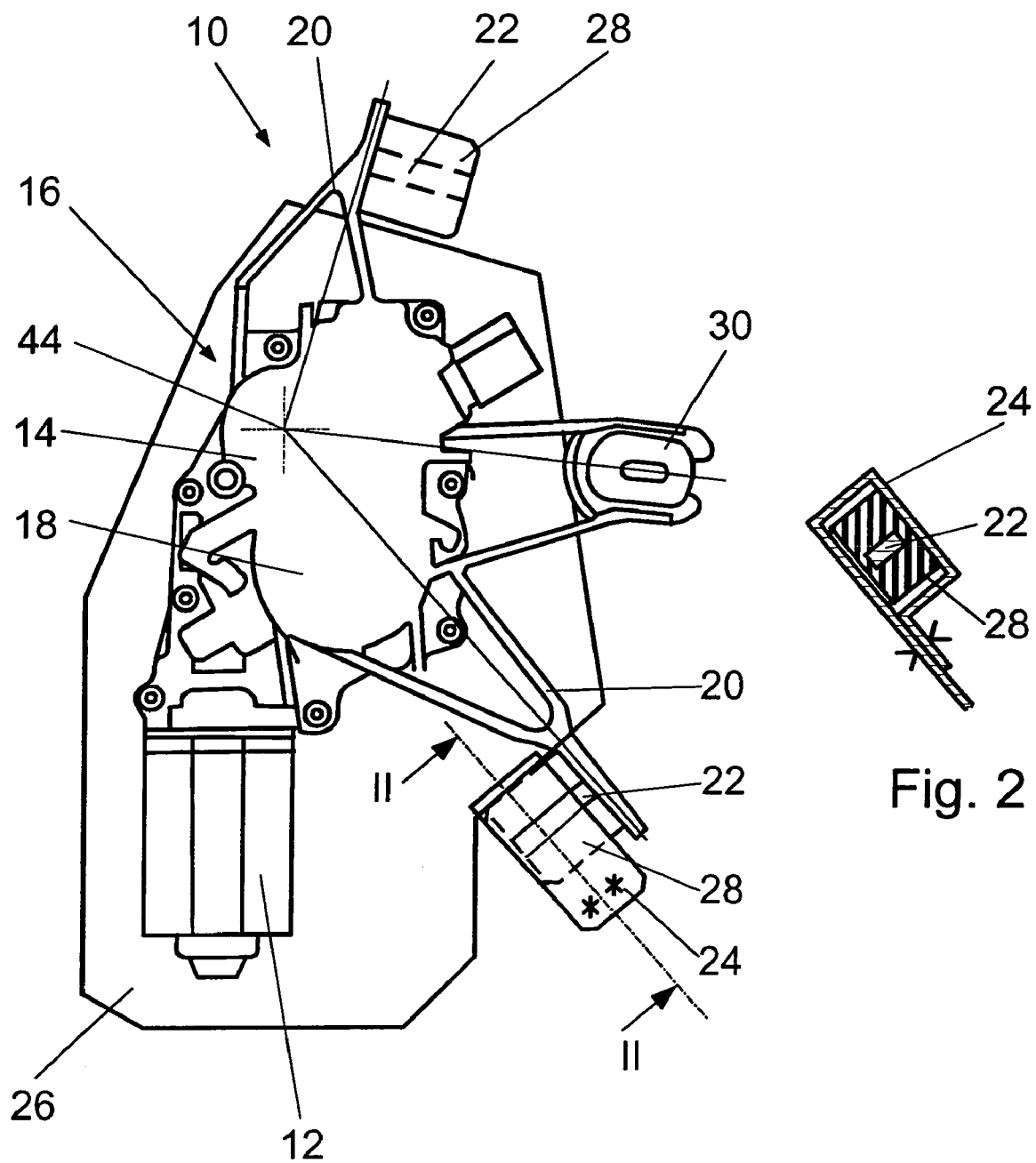

The invention relates to a windshield wiper device, in particular for a motor vehicle, in accordance with the species of the independent claims.

Numerous windshield wiper devices for motor vehicles that have a driving element that is fastened to the body of the motor vehicle are already known. Typically, these types of driving elements are screwed down to the vehicle body, which, however, is very expensive and necessitates a lot of parts such as screws, screw nuts and washers, etc. This is expensive logistically as well as complex in terms of installation. In addition, a windshield wiper device is known from DE 100 62 617 A 1, which is glued into the motor vehicle, whereby the adhesive possesses damping properties.

A windshield wiper system for vehicles is known for DE 198 33 404 A1, which makes assembly without screws possible and is therefore quick and simple to perform. To do this, the windshield wiper system features a supporting structure for a driving device. A number of first fastening elements are provided on the supporting structure, which project in a first direction from the supporting structure. A number of second fastening elements project in a second direction running at an angle between 45 and 135 degrees to the first direction, preferably at an angle of 90 degrees. The fastening elements are embodied as cylindrical plug pins, whose one end is connected to the supporting structure and whose free end is inserted into a receptacle opening of a rubber elastic damping element. This is inserted into an assembly opening of the vehicle body. The assembly opening can be located in a bent or deep-drawn bracket, which is welded onto the vehicle body. The free end of the plug pin can have a preferably conical thickening in order to be able to fix said end in the damping element by locking. Since the assembly directions of the first and second fastening elements run at one angle, it cannot be ruled out that the supporting structure will be subjected to stress after assembly, which is transmitted to adjacent parts of the body.

ADVANTAGES OF THE INVENTION

The advantage of the windshield wiper device in accordance with the invention with the features of the main claim is that the number of moving parts is reduced because of two essentially elongate fastening elements that are disposed in an axially rigid manner, which engage in receptacles of the motor vehicle. This produces a cost effective and simple possibility for fastening the driving element. The fastening elements are designed and arranged in such a way that they do not generate any tension among themselves, which would additionally stress the body and/or the driving elements.

It is particularly advantageous if the driving element has a driven shaft and the fastening elements are positioned such that the driving element can be fastened by being rotated around an axis that runs essentially parallel to the driven shaft. In this way, several fastening elements can be brought into engagement with the receptacles in the motor vehicle in one work step. This saves time in manufacturing and reduces the complexity of the manufacturing step.

Advantageous developments and improvements of the features disclosed in the main claim are yielded in the measures listed in the subordinate claims.

It is particularly advantageous in this connection if the fastening elements are each arranged essentially on a common circle. In this way, it is especially simple to place the driving element on the body and fasten it in the motor vehicle by a simple rotational movement.

A receptacle for a rivet or a screw or a clip is provided as a locking element for fixing the driving element. It is especially advantageous if the locking element itself is embodied as a clip.

In one variation, it is advantageous to embody the locking element as a weld or an adhesive joint. As a result, an optimal hold of the driving device in the vehicle is achieved by means of an integral connection, for example.

A windshield wiper device in accordance with the pre-characterizing clause of Claim 1 advantageously features a driving element, which has a fastening element at its disposal, on which an adhesive for adhering to the vehicle is applied, covered by protection. In this case, it is particularly advantageous if a damping element is arranged between the driving device and the adhesive.

In one variation, small quantities or drops of adhesive are advantageously enclosed by protection, which automatically destroys itself during connection to the vehicle permitting the adhesive to exit.

A simple variation is advantageously produced in that the protection is embodied as a protective film, which can be detached before connection with the vehicle or can be destroyed during connection. It is especially advantageous if, in terms of these kinds of connections, the adhesive is embodied as a multi-component adhesive.

A windshield wiper device in accordance with the pre-characterizing clause of Claim 1 advantageously features a rivet that can be fastened to the vehicle, wherein a damping element is arranged between the rivet and the vehicle. In this case, it is particularly advantageous if the rivet presses the damping element against the fastening arm and the receptacle resulting in a damped connection that is free if play.

In addition, it must be viewed as advantageous if the rivet has a cylindrical region, which has a thickening on at least one location, which is used to lock the driving device. In an especially advantageous embodiment, the thickening stresses the damping element so that an especially good hold of the driving device in the vehicle is produced.

According to an embodiment of the invention, the fastening element is slid in a first assembly direction running in the longitudinal direction of the driven shaft into an assembly opening of the body. Said fastening element can be locked in the assembly opening in a second assembly direction running in the circumferential direction of the rotation around which the driving element is rotated during assembly so that it can no longer be pulled out of assembly opening. For this purpose, the fastening element expediently has a U-shaped cross-sectional profile, which is open in the second assembly direction, and into which a damping element is inserted. Said damping element has a slot that is also open towards the open side into which the edge of the assembly opening can be slid. As a result, all of these types of fastening locations, which lie on one or more concentric circles around the rotational axis, can be mounted with a rotational movement of the driving element. Said rotational axis advantageously lies coaxially or axially parallel to the driven axis. The locking element prevents the fastening locations from being detached unintentionally. Furthermore, it is possible to arrange the fastening elements in such a way that the gravitational force of the driving element presses the fastening elements against the edge of the assembly opening.

For easier assembly of the windshield wiper device it is advantageous if the fastening element has a guide surface, with which it can glide during assembly in the first assembly direction along an edge of the assembly opening and be guided thereby. In this case, in accordance with another embodiment of the invention, the fastening element has a limit stop, which restricts the assembly movement in the first assembly direction.

As a rule, it is sufficient for the assembly opening to be punched in a flat wall of the vehicle body. In order to obtain a more dimensionally stable connection of the windshield wiper device to the vehicle body and create a free space for the driving element, it is expedient to provide the assembly opening in a deep-drawn cavity of the body. Moreover, the assembly opening can also be arranged in a correspondingly designed sheet metal part which is welded to the vehicle body.

DRAWINGS

Exemplary embodiments of the invention are depicted in the drawings and explained in greater detail in the following description.

Figure 3:
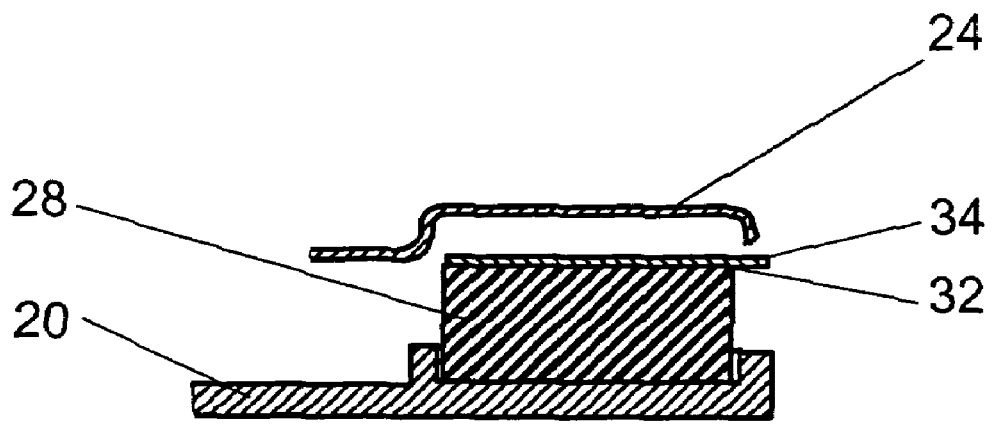
Figure 4:
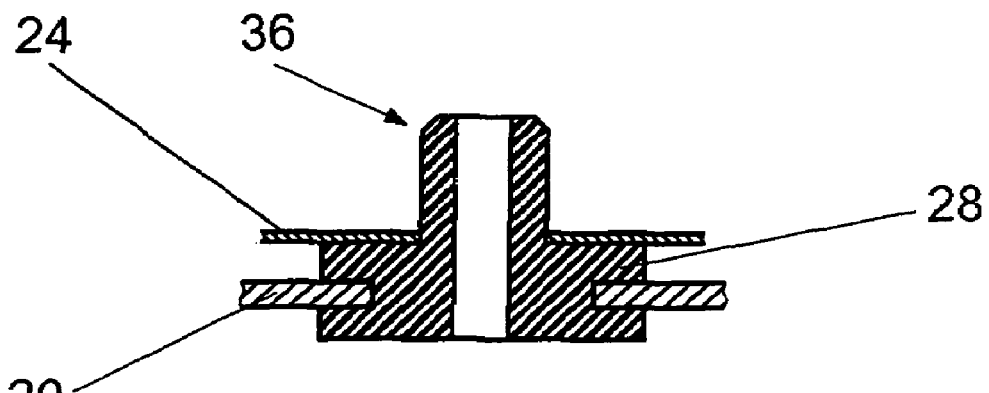
Figure 5:
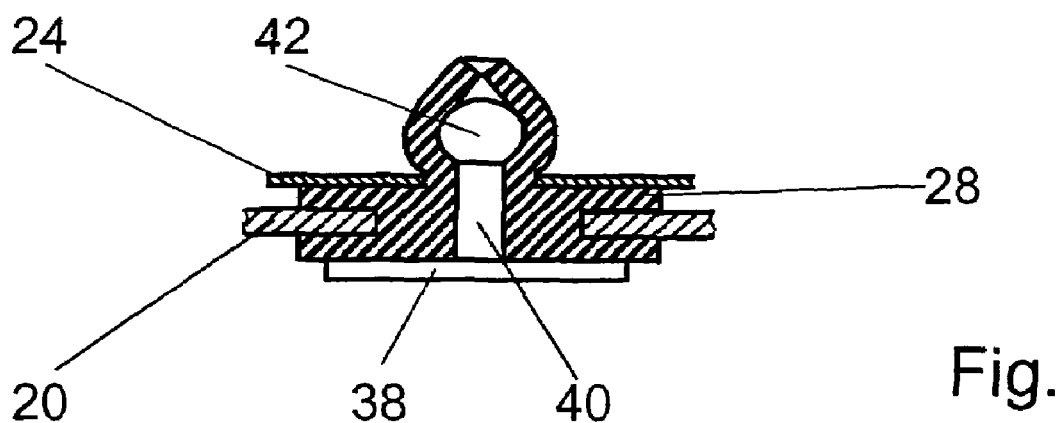
Figure 6:
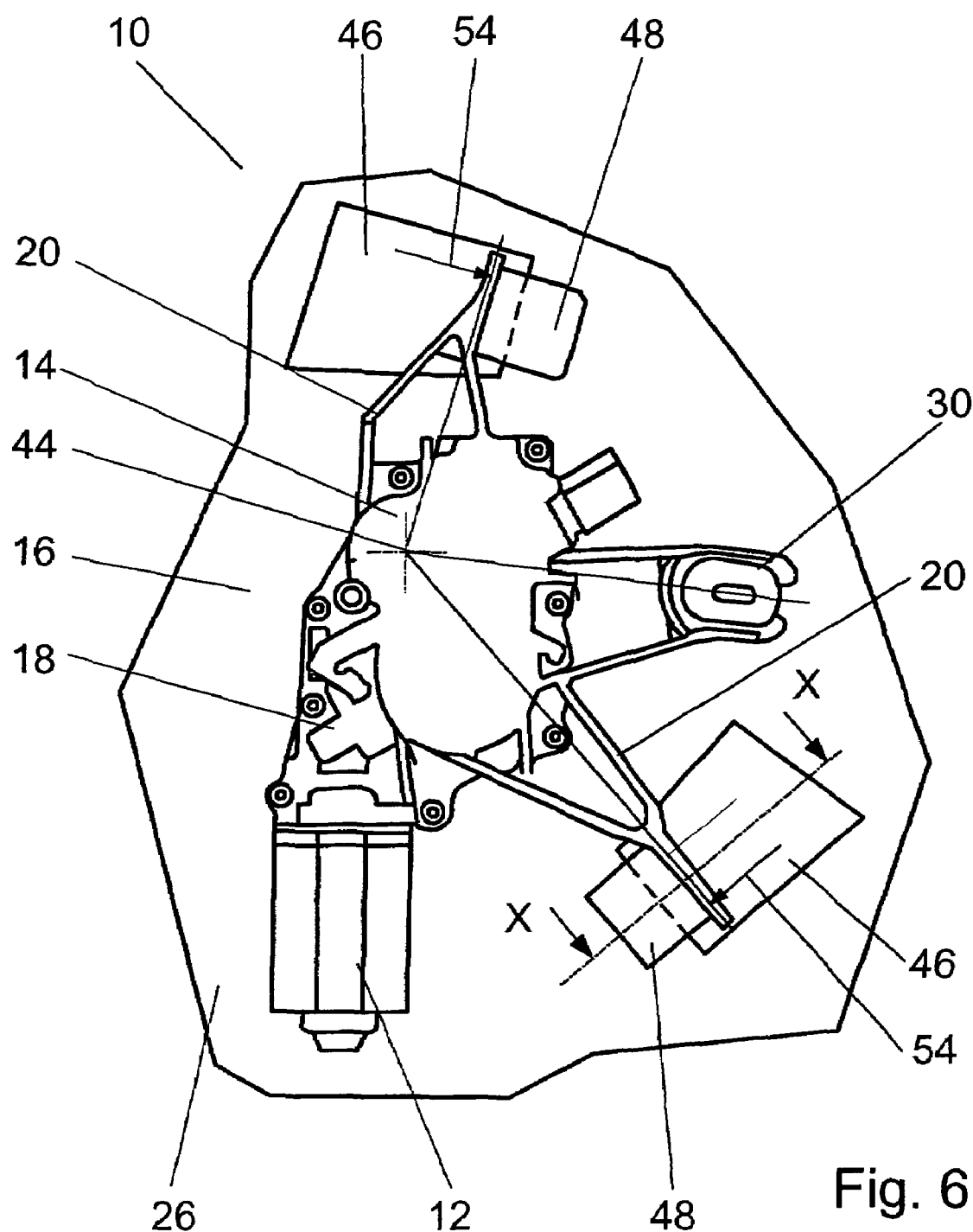

The drawings show:

FIG. 1 A schematic depiction of a driving device of a windshield wiper device in accordance with the invention, FIG. 2 A section through a fastening location of a driving device corresponding to Line II-II in FIG. 1, FIG. 3 A schematic section of a glued connecting point of a windshield wiper device in accordance with the invention, FIGS. 4 and 5 A schematic section of a connecting point with a rivet of a windshield wiper device in accordance with the invention, FIG. 6 A variation of FIG. 1, and FIG. 7 to 10 Steps in a fabrication and assembly sequence of a fastening point according to FIG. 6.

DESCRIPTION OF THE EXEMPLARY EMBODIMENTS

FIG. 1 shows a schematic depiction of a windshield wiper device 10 of a rear windshield of a motor vehicle. Naturally, the invention is in no way restricted to rear windshield wipers and is applicable without a problem to front windshield wipers. The windshield wiper device 10 is comprised of an electric motor 12 with a gear mechanism 14, which together form a driving element 16. The driving element 16 has a housing 18, which is made partially of cast material and from which fastening arms 20 extend radially, on each of whose ends a fastening element 22 is arranged. The fastening elements 22 are embodied here as rectangular parallelepiped-shaped rods, which extend perpendicular to the radial direction of the longitudinal extension of the fastening arms 20. Naturally, the fastening elements 22 can also be embodied otherwise. Thus, cylindrical or elliptical fastening elements 22 are also conceivable for example. In addition, the fastening elements 22 are arranged in such a way that, in their longitudinal extension, they lie on tangents of a circle whose center point lies expediently on the rotational axis of a driven shaft 44 or an axis that runs parallel thereto. The fastening elements 22 are inserted into pocket-like receptacles 24, which are formed in the body 26 of the motor vehicle. Damping elements 28 are inserted into the receptacles 24 for damping the vibrations.

Because of the tangential arrangement of the fastening elements 22, the driving element 16 can be rotated around a driven shaft 44 or around an axis parallel thereto by a rotational movement. The driving element 16 is fixed by a locking element 30, which is formed by a mouth-like receptacle for a screw or a rivet as a locking element 30. The center of the circle on whose tangents the fastening elements 22 are arranged should meaningfully not lie in the area of the locking element 30.

FIG. 2 shows a section through a receptacle 24 with the fastening element 22 and the damping element 28. The rectangular parallelepiped-shaped fastening element 22, which is surrounded by the damping element 28, sits in the center of the receptacle 24. The receptacle 24 is embodied as a one-part piece as a pocket from a sheet metal bracket of the vehicle body 26 and bent in a loop-like manner. It is welded together at the point where both ends of the loop are brought together.

FIG. 3 depicts a variation for fastening the driving element 16 of a windshield wiper device 10 in accordance with the invention. The fastening arm 20 of the windshield wiper device 10 bears the damping element 28 on its free end in a shovel-like receptacle and the damping element is glued in place in the shovel-like receptacle 24. The damping element 28 is provided with adhesive 32 on the side facing away from the fastening arm 20 and this adhesive is covered with a protective layer 34. In order to fasten the driving element 16 to the vehicle body 26, the protection 34 is pulled off of the adhesive 32 and it is pressed into the receptacle 24 of the body 26. In this case, the person skilled in the art is naturally completely free in terms of the design of the damping element $22^1$. In another variation it is conceivable for the adhesive 32 to be executed as a two-component adhesive or a contact adhesive, of which one component is applied to the receptacle 24 and the other component to the damping element 28 so that they adhere to each other on contact, as is known of contact adhesives. In another variation, the adhesive is encapsulated in microscopic balls that burst when the damping element 28 is pressed firmly into the receptacle 24 allowing the adhesive to flow out.

[1] Translator's note: Elsewhere, the damping element is designated "28." The fastening element is "22."

FIG. 4 shows another variation of the fastening from FIG. 3. The receptacle 24 in the vehicle body 26 is essentially comprised of a hole. Inserted into this hole is the damping element 28, which is connected to the fastening arm 20 of the driving device 16 and has a hollow cylinder-like region 36, which is inserted into the hole (that can also be elliptical or rectangular for example) of the receptacle 24. For locking purposes, a rivet 38 is inserted into the damping element 28 from the side facing away from the receptacle 24 and the rivet has a cylindrical region 40, which is terminated by a thickening 42. The thickening 42 is arranged in this case such that when the rivet 38 is inserted into the damping element 28, the damping element 28 is stressed in such a way that it induces clamping of the damping element 28 on the receptacle 24. Since the damping element 28 as shown here with a groove-like receptacle is connected to the fastening arm 20 of the driving element 16, a secure connection is achieved in this way between the vehicle body 26 with the receptacle 24 and the driving element 16.

Of course, all of the fastening types of the driving device that are shown here can be combined with one another on the vehicle body as desired. For example, the riveted fastening shown in FIG. 5 can also be provided in such a way that the rivets 38 are arranged tangentially, as shown in FIG. 1. In another variation, the receptacle 24 shown in FIG. 1 can also be fastened via a rivet, as shown in FIG. 4 and FIG. 5. A corresponding adhesive joint, as shown in FIG. 3, is also conceivable here. Furthermore, the adhesive joint shown in FIG. 3 can also be combined with the riveted joint shown in FIG. 5. It is particularly advantageous in this connection if three fastening points are provided, one of which is represented with a rivet 38 and the other two with the adhesive joint from FIG. 3.

Figure 8:
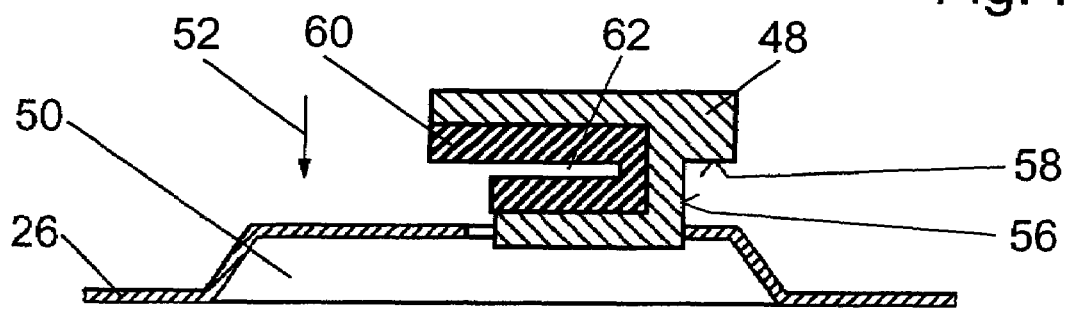

In the case of the design in FIG. 6, fastening elements 48 are fastened to the fastening arms 20 or formed on as a one-piece part. They have a projecting part, with which they can be slid through an assembly opening 46 in the body 26 in a first assembly direction 52 (FIG. 8). In this case, a guide surface 56 glides along on an edge of the assembly opening 46 in an advantageous manner with the assembly movement in the first assembly direction 52 being restricted by a limit stop 58 on the fastening element 48.

The fastening element 48 has a U-shaped cross-sectional profile, which is open in a second assembly direction 54, and into which a damping element 60 made of an elastic material is inserted. This damping element has a slot 62 that is also open towards the open side into which the coordinating edge of the assembly opening 46 glides when the fastening element is moved in the second assembly direction 54.

Figure 7:
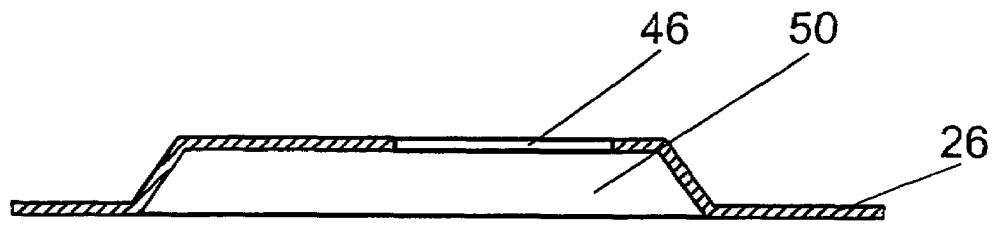
Figure 9:
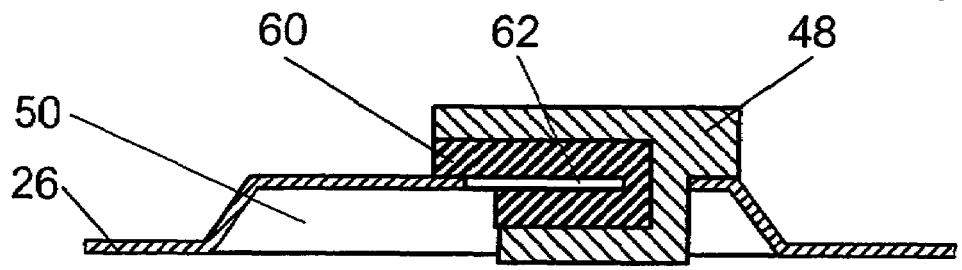
Figure 10:
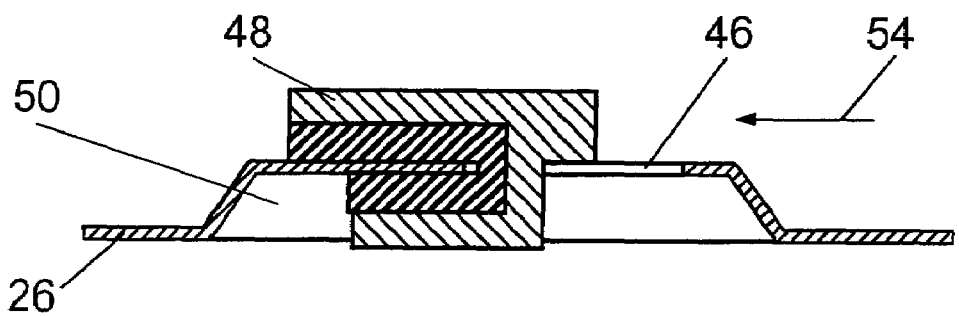

The assembly opening 46 is punched into the sheet metal of the body 26, whereby it is expedient to provide a cavity 50 via deep drawing at the same time. As a result, a corresponding elevation arises on the other side of the body 26, which creates a free space between the driving element 16 and the body 26 (FIG. 7). In addition, the body 26 is more dimensionally stable in the fastening region. The fastening element 48 is then slid into the assembly opening 46 in direction 52 (FIG. 8) until it is adjacent to the limit stop 58 (FIG. 9). In this position the slot 62 is opposite from the edge of the assembly opening 46 that faces away from the guide surface 56. A rotation in the second assembly direction 54 slides the fastening element 48 over the coordinating edge of the assembly opening 46, whereby the damping element 60 is adjacent to the sheet metal of the body 26 under initial tension (FIG. 10). The locking element 30 is fixed at this final position by a screw or a rivet.

The invention claimed is:

1. Windshield wiper device (10) for a motor vehicle, comprising at least one driving element (16) that can be fastened to the motor vehicle, at least two essentially elongate fastening elements (22, 48) which are disposed in an axially rigid manner and are able to engage in receptacles (24, 46) of the motor vehicle, and at least one damping element (28, 60) for damping mechanical vibrations, characterized in that the driving element (16) has a driven shaft (44) and the fastening elements (22, 48) are positioned such that the driving element (16) can be fastened by being rotated around one of the driven shaft (44) and an axis that runs essentially parallel thereto.

2. Windshield wiper device (10) according to claim 1, characterized in that the fastening elements (22) are each arranged essentially on tangents of a circle around the driven shaft (44) or an axis that runs essentially parallel thereto.

3. Windshield wiper device (10) according to claim 1, characterized in that a locking element (30) is provided for fixing the driving element (16).

4. Windshield wiper device (10) according to claim 3, characterized in that the locking element (30) is embodied as a receptacle for a rivet, a screw or a clip or is itself embodied as a clip.

5. Windshield wiper device (10) according to claim 3, characterized in that the locking element (30) is embodied as a weld or an adhesive joint.

6. Windshield wiper device (10) for a motor vehicle, comprising at least one driving element (16) that can be fastened to the motor vehicle, at least two essentially elongate fastening elements (22, 48) which are disposed in an axially rigid maimer and are able to engage in receptacles (24, 46) of the motor vehicle, and at least one damping element (28, 60) for damping mechanical vibrations, characterized in that the driving element (16) has at least one fastening location at which an adhesive (32) for adhering to the vehicle is applied, covered by protection (34).

7. Windshield wiper device (10) according to claim 6, characterized in that a damping element (28) is arranged between the driving device (16) and the adhesive (32).

8. Windshield wiper device (10) according to claim 6, characterized in that small quantities of the adhesive (32) are enclosed by protection (34), which automatically destroys itself during connection to the vehicle.

9. Windshield wiper device (10) according to claim 6, characterized in that the protection (34) is embodied as a protective film, which can be detached before connection with the vehicle or can be destroyed during connection.

10. Windshield wiper device (10) according to claim 6, characterized in that the adhesive (32) is embodied as a multi-component adhesive.

11. Windshield wiper device (10) for a motor vehicle, comprising at least one driving element (16) that can be fastened to the motor vehicle, at least two essentially elongate fastening elements (22, 48) which are disposed in an axially rigid manner and are able to engage in receptacles (24, 46) of the motor vehicle, and at least one damping element (28, 60) for damping mechanical vibrations, characterized in that the driving device (16) can be fastened to the vehicle by at least one rivet (38), wherein a damping element (28) is arranged between the rivet (38) and the vehicle, and said damping element is pressed against the fastening arm (20) and the receptacle (24) by the rivet (38).

12. Windshield wiper device (10) according to claim 11, characterized in that the damping element (28) has at least one elastic, hollow cylindrical section (36), into which the rivet (38) can be inserted.

13. Windshield wiper device (10) according to claim 12, characterized in that the rivet (38) has a cylindrical region (40), which has a thickening (42) at least one location, which is used to lock the driving device (16).

14. Windshield wiper device (10) according to claim 13, characterized in that the thickening (42) stresses the damping element (28).

15. Windshield wiper device (10) according to claim 1, characterized in that the fastening element (48) is slid in a first assembly direction (52) running in the longitudinal direction of the driven shaft (44) into an assembly opening (46) of the body (26) that serves as a receptacle and can be locked in a second assembly direction (54) running in the circumferential direction of the rotation.

16. Windshield wiper device (10) according to claim 15, characterized in that the fastening element (48) has a U-shaped cross-sectional profile, which is open in the second assembly direction (54), and into which a damping element (60) is inserted, which has a slot (62) that is also open towards the open side into which the edge of the assembly opening (46) can be slid.

17. Windshield wiper device (10) according to claim 15, characterized in that the fastening element (48) has a guide surface (56), with which it can glide during assembly in the first assembly direction (52) along an edge of the assembly opening (46).

18. Windshield wiper device (10) according to claim 15, characterized in that the fastening element (48) has a limit stop (58), which restricts the assembly movement in the first assembly direction.

19. Windshield wiper device (10) according to claim 15, characterized in that assembly opening (46) is provided in a deep-drawn cavity (50) of the body (26).

* * * * *